J. D. WHITNEY.
Vehicle-Spring.

No. 223,460.      Patented Jan. 13, 1880.

UNITED STATES PATENT OFFICE.

JONAH D. WHITNEY, OF SYRACUSE, NEW YORK.

VEHICLE-SPRING.

SPECIFICATION forming part of Letters Patent No. 223,460, dated January 13, 1880.

Application filed November 25, 1879.

*To all whom it may concern:*

Be it known that I, JONAH D. WHITNEY, of Syracuse, Onondaga county, New York, have invented a new and Improved Side-Bar Wagon-Spring, of which the following is a full, clear, and exact description, reference being had to annexed drawings, in which—

Figure 1:
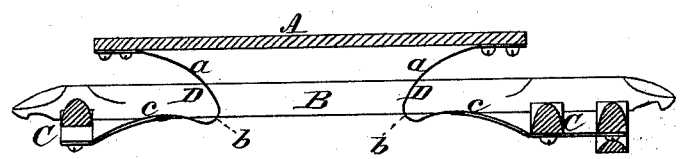
Figure 2:
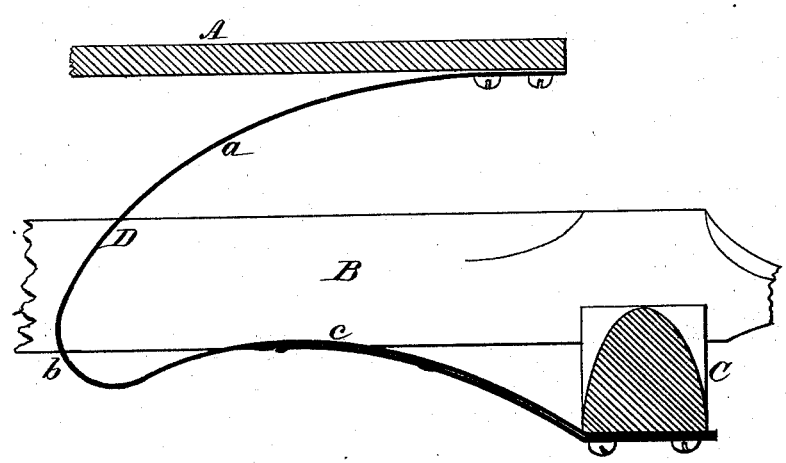

Figure 1 is a sectional view of the springs and body. Fig. 2 is an enlarged view of the spring.

My invention consists, first, of an improved spring constructed in one leaf and bent so as to make a lower arm and an upper one, the upper arm being a plain arc and the lower arm of an ogee shape, with a round bend between them; and, second, in the combination, in a side-bar wagon, of such a spring with the body and gear.

A is the wagon-body. B B are the side bars, such as are ordinarily used in side-bar wagons. C C are the cross-bars between the ends of the side bars. D D are the springs. They are made of substantially the form shown in the drawings, and of any weight desired.

By experiment I have determined that a spring of a simple V shape, with a sharp or a round bend, did not perform all of the functions desired and requisite; that it did not possess that elasticity and spring, in connection with stiffness and strength, which is desired. The spring shown in the drawings has these properties.

The curved upper arm, $a$, made with an additional short top leaf, if desired, and with the round bend at $b$, gives the stiffness, and the ogee curved lower arm, $c$, gives the spring and elasticity. A short leaf added to the lower arm, $c$, gives additional strength and stiffness, and does not impair the spring and elasticity. The upper arm, $a$, is bolted or otherwise securely fastened to the body, and the lower arm, $c$, is fastened by bolts or clips to the gear-frame. It can be attached to either the side bars or to the cross-bars.

When the lower arm, $c$, is fastened to the side bars the upper arm, $a$, is so fastened to the body that the bend of the spring projects inwardly and crosswise of the body.

When fastened to the cross-bar of the gear-frame the upper arm, $a$, is fastened to the body, so that the springs project inwardly and lengthwise of the body-frame.

The rear axle-tree is usually attached to the under side of the rear cross-bar of the gear-frame, in which case the clips upon the lower arms, $c$, of the rear springs pass over and around the whole axle.

It will be noticed that the upper arc of the spring extends downward from its point of attachment with a convex upper surface, and that the lower arc extends upward from its point of attachment with a convex surface, and joins the upper arc with the short bend, $b$, and that from this joining the two arcs diverge to their points of attachment.

I am aware that a U-shaped spring has been used in a manner to extend crosswise of and beneath the body, and I do not claim a spring of such form and so arranged, but a spring differing in important particulars of form and construction, and having advantages not possessed in the other.

What I claim as my invention is—

1. A side-bar spring formed with the upper arc, $a$, extending downward and the lower arc, $c$, extending upward, the two joining by a short bend, $b$, having their upper surfaces convex and diverging from said short bend to their points of attachment, substantially as shown and described.

2. The spring formed with the upper arc, $a$, extending downward and the lower arc, $c$, extending upward, the two joining with a short bend, $b$, and diverging therefrom with convex upper surfaces, in combination with the cross-bars C C and the wagon-body, substantially as herein set forth.

J. D. WHITNEY.

Witnesses:
 C. W. SMITH,
 HAMILTON BAXTER.